Oct. 2, 1923.

M. DEAN
ANTISKID DEVICE
Filed Dec. 21, 1922

Inventor
MICHAEL DEAN.
By William C. Linton
Attorney

Oct. 2, 1923.

M. DEAN

ANTISKID DEVICE

Filed Dec. 21, 1922

Inventor
MICHAEL DEAN.

By William C. Linton
Attorney

Patented Oct. 2, 1923.

1,469,312

UNITED STATES PATENT OFFICE.

MICHAEL DEAN, OF WEBSTER, PENNSYLVANIA.

ANTISKID DEVICE.

Application filed December 21, 1922. Serial No. 608,309.

*To all whom it may concern:*

Be it known that I, MICHAEL DEAN, a citizen of the United States of America, residing at Webster, in the county of Westmoreland and State of Pennsylvania, have invented certain new and useful Improvements in Antiskid Devices; and I do hereby declare that the following is a full, clear, concise, and exact description of the invention, such as will enable others skilled in the art to which it appertains to make and use the same.

This invention relates to improvements in anti-skidding devices for use upon vehicle wheel tires and has for an object to provide an anti-skidding device wherein the traction increasing chains are so arranged and interconnected as to prevent skidding of a vehicle wheel equipped therewith either longitudinally or transversely of a slippery or muddy way being traversed by the wheel and in the event that certain of the links of the chains should become broken, as by excessive strain or wear, the efficiency of the device will not be materially detracted from and also, will remain in proper position over the tread portion of the vehicle tire.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same.

Figure 3:
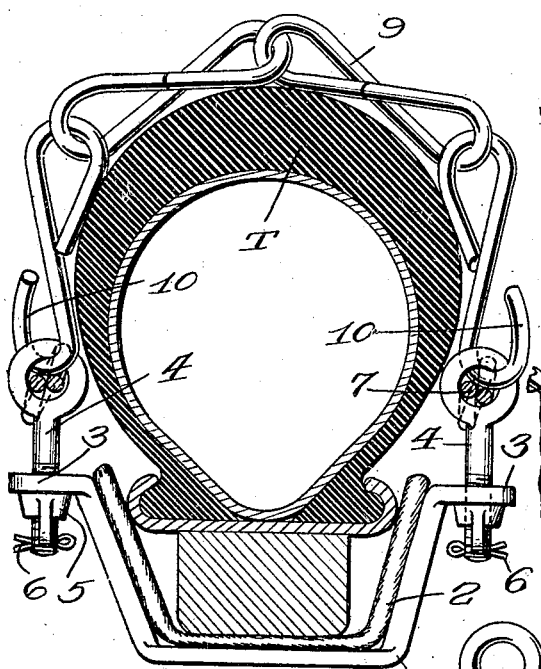
Figure 3 is a vertical transverse section through the tire of the vehicle wheel showing a portion of the chain.

Having more particular reference to the drawings, in connection with which like characters of reference will designate corresponding parts throughout, the improved anti-skid device is herein shown as applied to an ordinary vehicle wheel T. Substantially U-shaped anchoring brackets 1 are provided and are adapted to be snugly engaged over the felly and rim portions of the wheel as is more particularly shown in Figure 3 and these anchoring brackets 1 occur at equi-distant intervals throughout the circumference of the vehicle tire. The inner faces of these anchoring brackets are each lined with a suitable pad 2 so as to prevent the bracket from scratching or otherwise injuring the rim of the vehicle wheel. These brackets 1 are provided with apertured ears 3 formed with the opposite extremities thereof and are adapted to receive the threaded shank portions of the eye-bolts 4 and locking wing nuts 5 are turned into engagement with the screw threaded shank portions of said eyebolts 3 and are prevented against turning by the employment of cotter pins 6. Arranged on each side of the tire and extending through the eyelets of the bolts 4 are the chains 7 which are each provided with the latch member 8 whereby their opposite ends may be connected together. Arranged at equi-distant intervals throughout the circumference of the vehicle tire and extending transversely thereof are the chains 9 engaged at their opposite ends with the hooks 10. These chains 9 extend over the tread portions of the tire adjacent each of the anchoring brackets 1 and the hook members 10 thereof may engage in the eyelets of the bolts 4 as shown in the drawing or they may engage in the chains 7. These chains 9 form an effectual connection between the chains 7 and they serve to retain these chains 7 as well as the anchoring brackets 1 in proper position to the vehicle tire.

Figure 1:
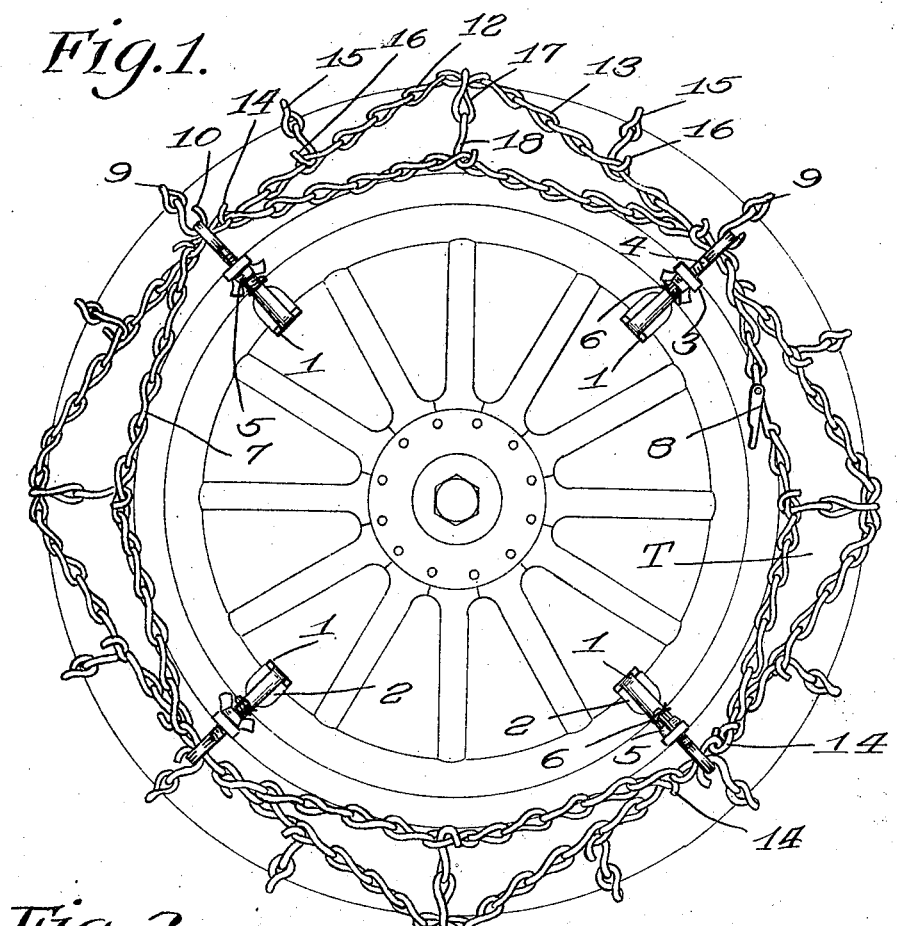
Figure 1 is a side elevation of an ordinary vehicle wheel having my invention applied thereto.
Figure 2:
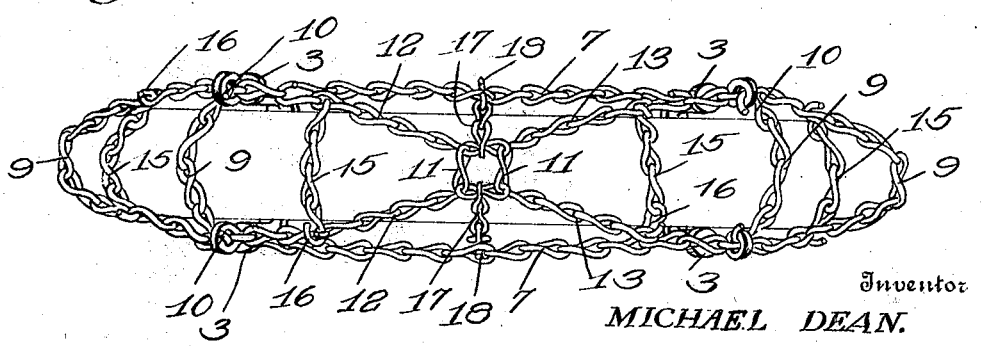
Figure 2 is a top plan view of the same.
Figure 4:
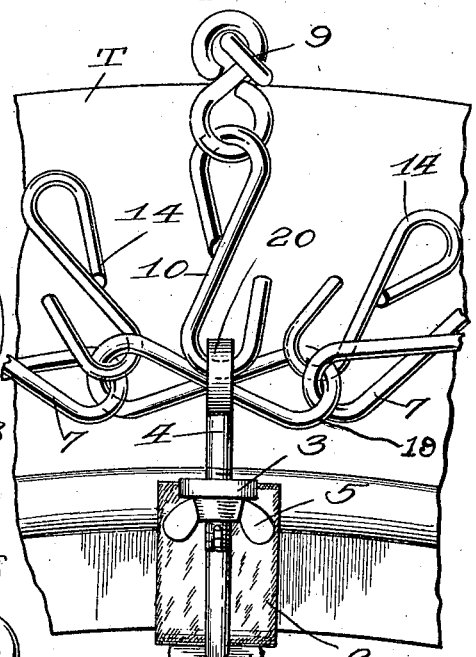
Figure 4 is a side elevation of the same.
Figure 5:
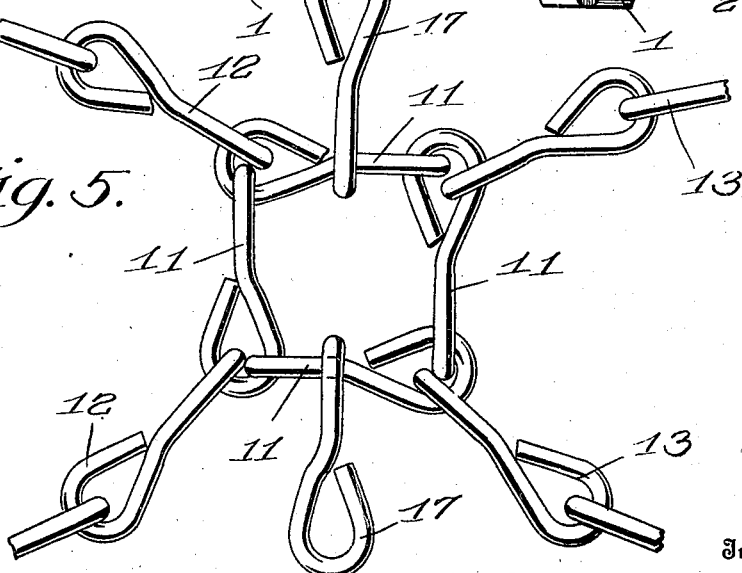
Figure 5 is an enlarged detail of the chain.

When employing four anchoring brackets 1 as illustrated in Figure 1 of the drawing, the anti-skid chain is divided into four sections and each section is arranged between the chains 9 upon the tread portion of the vehicle tire. Therefore, in the following description, I will only describe one of these sections and it of course will be understood that any number of sections may be employed each having the chains of the same design and construction. The medial portion of each section comprises four links 11 which are connected to form a square as is better illustrated in Figure 5. Extending diagonally across the tread of the tire are two sets of chains, each of which consists of two sections indicated by the numerals 12 and 13. The inner ends of these sections 12 and 13 are connected to the links 11 whereas their opposite ends are provided with hooks 14 which engage the chains 7. Transversely extending chains 15 are also provided upon the tread portion of the tire and each of these chains 15 are provided with hooks 16 at their extremities which are engaged in the chains 12 and 13 for retaining the chains 15 in place. Connected to the links 11 are the chains 17 and each of these chains are provided with hooks 18 which also engage the chains 7 arranged on each side of the vehicle tire thereby providing the means for properly anchoring the sections of the device upon the tread portion of the vehicle tire. Having reference more particularly to Figure 4 of the drawing, it will be noted that one link of the chains 7 which is indicated by the numeral 19 extends through each eyelet of the bolts 4 and the hooks 14 of the diagonally extending chain members 12 and 13 engage the links on each side of the eyelet 20 thereby locking the chains 7 so as to prevent the latter from moving circumferentially around the tire.

Because of the arrangement of the diagonally disposed chains 12 and 13 together with the transversely arranged chains 17 and links 11, it will be understood that a wheel equipped with the invention will be enabled to move over a muddy or slippery roadway without longitudinal or transverse skidding thereon. The diagonally disposed chains 12 and 13 by reason of their relative positioning with respect to the tread portion of the tire T together with the arrangement of the intermediate or crossed portions thereof will be such as to materially reduce possibility of side slipping or transverse movement of the wheel, while the arrangement of the transverse anti-skid chains 9 and 15 together with the diagonally disposed chains 12 and 13 will serve to prevent longitudinal slippage of the wheel upon a roadway. Furthermore, should certain of the links of the various chains become broken, as by the application of excessive stress thereto, or by wearing of the same excessively, it will be understood that the same will be prevented from becoming entirely disengaged from the vehicle tire or wheel by reason of their multiple connection to the same and in consequence, proper arrangement of the anti-skid device with respect to the tread portion of the tire T will be ensured, irrespective of breakage of certain of the chains.

Manifestly, the construction shown is capable of considerable modification and such modification as is within the scope of my claims, I consider within the spirit of my invention.

I claim:

1. An anti-skid device for vehicle wheels comprising chains extending diagonally over the tread portion of the wheel tire, means for inter-connecting the intermediate portion of said chains directly adjacent the tread portion of the vehicle tire, eye-bolts connected to the free extremities of said diagonal chains, transversely disposed chains connected at their opposite ends to the intermediate portions of said diagonally disposed chains, U-shaped anchoring brackets having laterally disposed apertured extremities arranged over the wheel felly and receiving said eye-bolts, and circumferentially arranged chains disposed upon the opposite sides of the wheel tire connected to the eye-bolts in equi-distant spaced relation.

2. An anti-skid device for vehicle wheels comprising a plurality of sections, anchoring members attached to the wheel and arranged between each two adjacent sections, eyelets adjustably secured to each anchoring member, a circumferentially disposed chain extending on each side of the wheel and passing through said eyelets, said sections each comprising diagonally extending chains, hooks provided for the ends of said diagonal chains, and said hooks engaging said circumferentially disposed chains on each side of said eyelets substantially as and for the purpose specified.

3. An anti-skid device for vehicle wheels comprising a circumferentially disclosed chain arranged on each side of the wheel tire, U-shaped anchoring brackets having laterally disposed apertured extremities arranged over the wheel felly, eye bolts received by said apertured extremities, said circumferentially disposed chains extending through said eye bolts, a plurality of tread sections extending over the wheel tire, each section consisting of diagonal chains having their medial portions interconnected and their opposite ends connected to said circumferentially disposed chains at points on each side of said eye bolts, transverse links connecting the medial portions of said diagonal chains with said circumferentially disposed chains, transverse chains arranged over the wheel tire and connected at their opposite ends to the intermediate portions of said diagonal chains and other transverse chains arranged over the tire tread and connected at their opposite ends to said eye bolts.

In witness whereof I have hereunto set my hand.

MICHAEL DEAN.